Jan. 17, 1956  H. J. McCAULEY, JR  2,731,274
ANIMAL SIMULATING VELOCIPEDE
Filed Feb. 28, 1955

INVENTOR.
HERBERT J. McCAULEY, JR.
BY
Beau, Brooks, Buckley & Beau,
ATTORNEYS.

United States Patent Office 2,731,274
Patented Jan. 17, 1956

2,731,274

ANIMAL SIMULATING VELOCIPEDE

Herbert J. McCauley, Jr., Buffalo, N. Y.

Application February 28, 1955, Serial No. 490,904

8 Claims. (Cl. 280—1.196)

This invention relates to a wheeled toy vehicle of the velocipede type and more particularly to such a toy which simulates an animal figure or body and is adapted for realistic animation or movement characteristic of such animal.

The present invention provides a wheeled toy of the above type which in the illustrated instance is generally of tricycle construction and which includes an animal body adapted to oscillate or rock synchronously with forward movement of the toy to simulate the natural body movements of a walking or running animal. The provision of wheeled toy vehicles including animal bodies and including means for oscillating the animal bodies is not broadly new but the present invention provides a novel and highly effective manner of disposing the body-simulating portion relative to the general framework of the vehicle and provides a novel drive arrangement for oscillating the same upon forward driving movement of the vehicle.

Furthermore, the animal body oscillating arrangement of the present invention is incorporated with the pedal operated drive arrangement of the velocipede in such a manner that it provides a highly simple, economical and rugged drive structure and, furthermore, provides a drive arrangement wherein the drive take-off for oscillating the animal body serves the dual purpose of simplifying the main drive arrangement.

Speaking generally, the velocipede of the present invention is of the pedal-operated chain drive type. Ordinarily, chain drive vehicles require that one of the sprockets, usually the driven sprocket, be adjustable in a lengthwise direction to establish and maintain proper tension in the driving chain. The present invention provides an arrangement wherein both the driving and driven sprockets have axes which are fixed relative to the frame of the vehicle and the construction is greatly simplified by dispensing with the usual adjustable sprocket supporting arrangement. This simplicity not only provides a very economical construction but results in a stronger, more rigid and more rugged drive arrangement.

The construction provided by the present invention affords an oscillating drive for rocking the animal figure or body during and as an incident to forward driving motion of the velocipede and this oscillating mechanism is driven from a sprocket which engages the driving chain between the usual driving and driven sprockets. Furthermore, this auxiliary sprocket is adjustable to impart the proper degree of tension to the driving chain incidentally and without in any way affecting the oscillating drive function of the mechanism.

One form of the velocipede of the present invention is illustrated in the accompanying drawing and described in detail in the following specification but it is to be understood that the present invention is not limited to the form thus shown by way of example nor otherwise than as defined in the appended claims.

Figure 1:
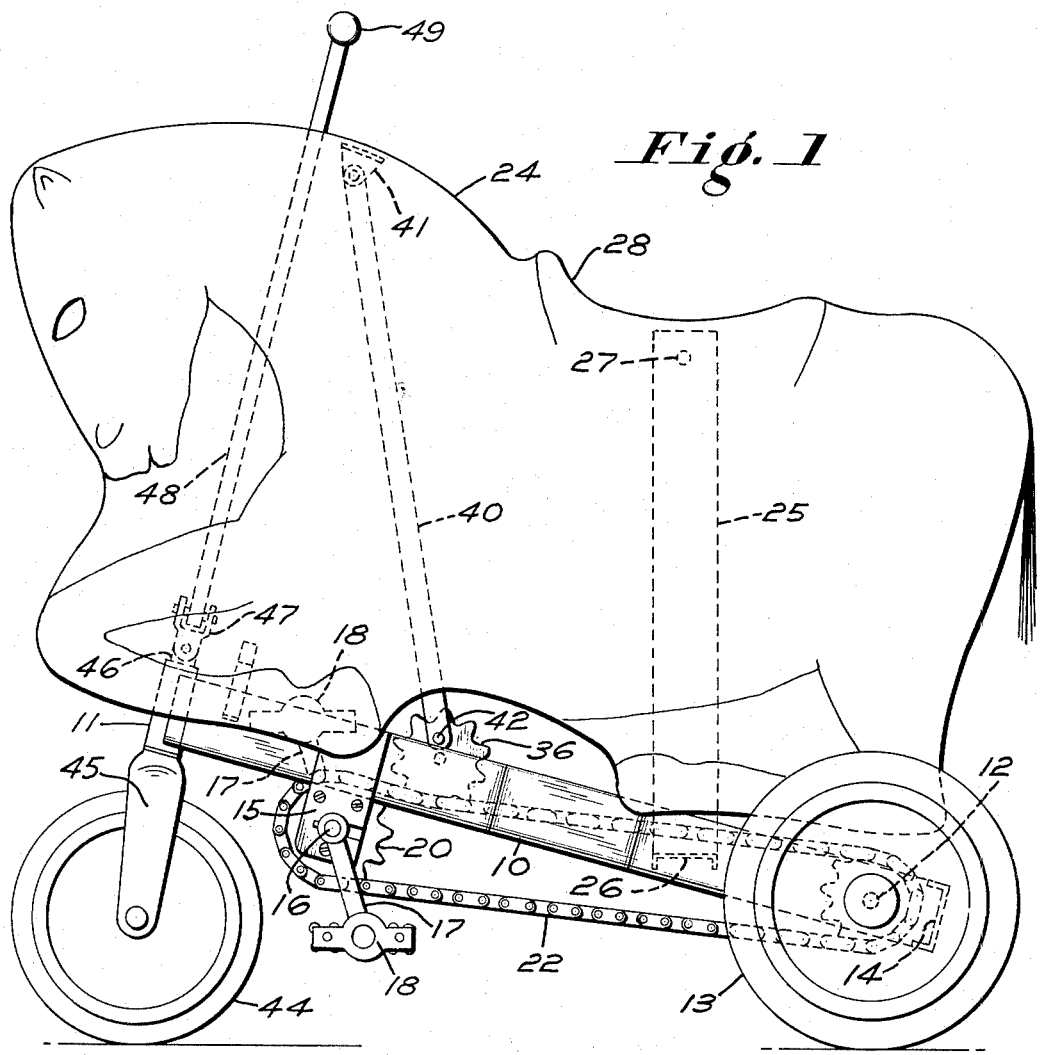
Figure 1 is a general side elevational view of one form of the wheeled toy vehicle of the present invention.

Like characters of reference denote like parts in the several figures of the drawing and the numeral 10 designates a pair of laterally spaced longitudinally extending frame members which converge at their front ends and are fixed, as by welding or the like, to a bearing 11. Adjacent to their rear ends frame members 10 give bearing support to a rotatable rear axle 12 which has fixed thereto a pair of rear ground wheels 13. A transverse frame member in the form of a channel 14 is welded at its opposite ends to the rear ends of frame members 10.

A pair of depending brackets 15 are fixed to frame members 10 and give bearing support to a drive shaft member 16 which has fixed thereto a pair of cranks 17 and the usual rotatable pedals 18. A drive sprocket 20 is fixed to drive shaft 16 and a driven sprocket 21 is fixed to rear axle 12, the sprockets 20 and 21 being connected for joint driving rotation by a chain 22.

Frame members 10 are provided with any suitable or desired intermediate cross bracing and give movable support to an animal simulating body member such as a horse or pony, as indicated at 24 in Fig. 1. A pair of rigid upright bars or structural members 25 straddle chain 22 and are fixed at their lower ends to a cross brace 26 which in turn is welded at its opposite ends to frame members 10. The upper ends of members 25 are pivoted to animal body 24 adjacent its upper end, such pivotal connecting being designated 27 in Fig. 1 and being associated with animal body 24 interiorly thereof.

In a preferred form of the present invention the pivot 27 is arranged to be located substantially immediately below the middle part of a saddle portion 28 on the animal body, whereby a child operating and riding upon the toy vehicle of the present invention is seated more or less directly over such pivot 27. Means are provided for oscillating animal body 24 about pivot 27 and the location of the latter is such that the oscillations do not involve any material raising and lowering movements of the weight of the child sitting in the saddle 27. Therefore a child may operate the toy with greater safety and stability and the force required to produce oscillation is relatively small and places no material additional load on the drive.

Figure 2:
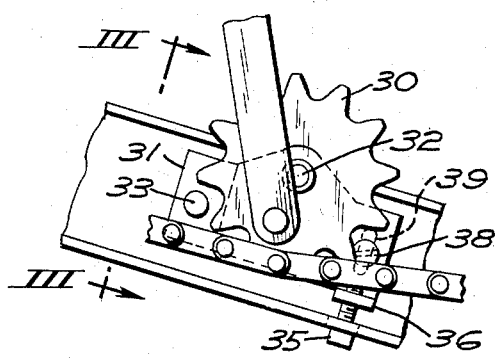
Fig. 2 is a fragmentary elevational view of the oscillating drive sprocket portion of the apparatus of Fig. 1 viewed in the same direction as Fig. 1.
Figure 3:
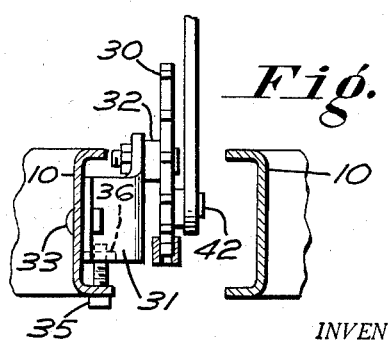
Fig. 3 is a fragmentary cross-sectional view on the line III—III of Fig. 2.

The means for oscillating the animal body by and upon forward movement of the vehicle and for simultaneously maintaining proper operating tension in drive chain 22 will now be described, with particular reference to Figs. 2 and 3. A sprocket 30 is supported for free rotation upon a bracket 31 as by means of a shoulder screw or bolt 32. Bracket 31 is pivotally attached to one of the longitudinal frame members 10, in the present instance adjacent to the forward end of bracket 31, the pivot for bracket 31 being designated 33 in Fig. 2.

Bracket 31 is adjusted about its pivotal connection 33 by means of an adjusting screw 35 which passes through a lower flange of the frame member 10 which carries bracket 31 and threads into a flange 36 formed on bracket 31. When bracket 31 is in properly adjusted position it is locked by means of a bolt and nut connection 38 which passes through an opening in bracket 31 and a slot 39 in frame member 10.

It will be seen from the foregoing that the centers of crank shaft 16 and rear axle 12 may be fixed and non-adjustable with respect to longitudinal frame members 10 and may be manufactured within moderately generous tolerances, since sprocket 30 may be adjusted to bear against the upper reach of chain 22 and maintain proper tension therein irrespective of variations in the center distances of crankshaft 16 and rear axle 12.

A link 40 is pivotally connected at its upper end to a bracket 41 fixed within animal body 24 as clearly shown in Fig. 1 and the lower end of link 40 is pivotally attached to sprocket 30 at a point offset from the center of rotation of sprocket 30, as at 42, and it will be clear from the foregoing that driving movement of the toy produces rotation of sprocket 30 by movement of chain 22 and accordingly oscillates link 40 more or less vertically to rock the animal body 24 about its pivotal support 27.

The front end of the wheeled toy is supported by a steerable ground wheel 44 which is supported for free ground engaging rotation in a fork or yoke 45. Yoke or fork 45 has a journal portion 46 at its upper end which is rotatably supported in bearing 11 and the upper end of journal 46 is provided with a universal joint connection 47 which connects journal 46 with a steering shaft 48 which extends upwardly through the animal body and terminates at its upper end in a cross bar 49 which may be manipulated by the child operating the vehicle to steer the same in an obvious manner by rotative movement of shaft 48 on its longitudinal axis.

What is claimed is:

1. In a wheeled toy vehicle having a frame structure and ground wheels rotatably supported thereby, an animal simulating body member including a rider-supporting saddle portion, means fixed to said frame structure and pivotally connected to said body member directly beneath said saddle portion, drive means including a pedal and drive sprocket mechanism carried by said frame structure, a driven sprocket connected to one of said ground wheels and a driving chain connecting said sprockets, and means for oscillating the body member about said pivotal connection comprising a third sprocket in meshing engagement with said chain between said first two sprockets and rotatably supported by said frame structure, and a link connected pivotally and eccentrically to said third sprocket at one end and to said body member at its other end.

2. In a wheeled toy vehicle having a frame structure and ground wheels rotatably supported thereby, an animal simulating body member including a rider-supporting saddle portion, means fixed to said frame structure and pivotally connected to said body member directly beneath said saddle portion, drive means including a pedal and drive sprocket mechanism carried by said frame structure, a driven sprocket connected to one of said ground wheels and a driving chain connecting said sprockets, and means for oscillating the body member about said pivotal connection comprising a third sprocket in meshing engagement with said chain between said first two sprockets, means rotatably supporting said third sprocket, means securing said supporting means to said frame structure for adjustable movement in the plane of said chain to adjust the tension thereof, and a link connected pivotally and eccentrically to said third sprocket at one end and to said body member at its other end to rock the body member about its pivotal support.

3. In a wheeled toy vehicle having a frame structure and ground wheels rotatably supported thereby, an animal simulating body member, means fixed to said frame structure and pivotally connected to said body member to support the same, drive means including a pedal and drive sprocket mechanism carried by said frame structure, a driven sprocket connected to one of said ground wheels and a driving chain connecting said sprockets, and means for oscillating the body member about said pivotal connection comprising a third sprocket in meshing engagement with said chain between said first two sprockets and rotatably supported by said frame structure, and a link connected pivotally and eccentrically to said third sprocket at one end and to said body member at its other end to rock the body member about its pivotal support upon rotation of said third sprocket.

4. In a wheeled toy vehicle having a frame structure and ground wheels rotatably supported thereby, an animal simulating body member, means fixed to said frame structure and pivotally connected to said body member to support the same, drive means including a pedal and drive sprocket mechanism carried by said frame structure, a driven sprocket connected to one of said ground wheels and a driving chain connecting said sprockets, and means for oscillating the body member about said pivotal connection comprising a third sprocket in meshing engagement with said chain between said first two sprockets, means mounted on said frame structure for rotatably supporting said third sprocket and for adjusting the same toward and away from said chain to vary the tension thereof, and a link connected pivotally and eccentrically to said third sprocket at one end and to said body member at its other end to rock the body member about its pivotal support upon rotation of said third sprocket.

5. In a wheeled toy vehicle having a frame structure and ground wheels rotatably supported thereby, an animal simulating body member including a rider-supporting saddle portion, means fixed to said frame structure and pivotally connected to said body member directly beneath said saddle portion, drive means including an endless chain for propelling said vehicle, and means for oscillating the body member about said pivotal connection comprising a sprocket in meshing engagement with said chain and rotatably supported by said frame structure, and a link connected pivotally and eccentrically to said third sprocket at one end and to said body member at its other end.

6. In a wheeled toy vehicle having a frame structure and ground wheels rotatably supported thereby, an animal simulating body member including a rider-supporting saddle portion, means fixed to said frame structure and pivotally connected to said body member directly beneath said saddle portion, drive means including an endless chain for propelling said vehicle, and means for oscillating the body member about said pivotal connection comprising a sprocket in meshing engagement with said chain, means rotatably supporting said sprocket and for adjusting the same toward and away from said chain to vary the tension thereof, and a link connected pivotally and eccentrically to said third sprocket at one end and to said body member at its other end.

7. In a wheeled toy vehicle having a frame structure and ground wheels rotatably supported thereby, an animal simulating body member, means fixed to said frame structure and pivotally connected to said body member to support the same, drive means including a driving chain for propelling said vehicle, and means for oscillating the body member about said pivotal connection comprising a sprocket in meshing engagement with said chain and rotatably supported by said frame structure, and a link connected pivotally and eccentrically to said third sprocket at one end and to said body member at its other end.

8. In a wheeled toy vehicle having a frame structure and ground wheels rotatably supported thereby, an animal simulating body member, means fixed to said frame structure and pivotally connected to said body member to support the same, drive means including a driving chain for propelling said vehicle, and means for oscillating the body member about said pivotal connection comprising a sprocket in meshing engagement with said chain, means mounted on said frame structure for rotatably supporting said sprocket and adapted to adjust the same toward and away from the driving chain to vary the tension thereof, and a link connected pivotally and eccentrically to said third sprocket at one end and to said body member at its other end.

References Cited in the file of this patent

UNITED STATES PATENTS

| 1,266,400 | Busby | May 14, 1918 |
| 1,396,475 | Tracey | Nov. 8, 1921 |
| 1,625,337 | Shelley | Apr. 19, 1927 |

FOREIGN PATENTS

| 340,863 | Germany | Sept. 20, 1921 |